(12) United States Patent
Epp et al.

(10) Patent No.: US 6,237,813 B1
(45) Date of Patent: May 29, 2001

(54) STORAGE BIN FOR PARTICULATE MATERIALS

(76) Inventors: Richard J. Epp; Dwayne S. Epp, both of Box 64, Fiske, Saskatchewan (CA), S0L 1C0

( * ) Notice: Subject to any disclaimer, the term of this patent is extended or adjusted under 35 U.S.C. 154(b) by 0 days.

(21) Appl. No.: 09/330,976

(22) Filed: Jun. 14, 1999

(51) Int. Cl.$^7$ ........................................ B67D 5/06
(52) U.S. Cl. ............... 222/185.1; 222/195; 222/413; 222/460
(58) Field of Search .............................. 222/185.1, 195, 222/342, 413, 460

(56) References Cited

U.S. PATENT DOCUMENTS

| | | | |
|---|---|---|---|
| 3,334,760 | * | 8/1967 | Bolinger et al. ............ 222/413 |
| 5,575,406 | * | 11/1996 | Buchfink ................... 222/195 |
| 5,709,322 | * | 1/1998 | Ricciardi .................. 222/413 |

FOREIGN PATENT DOCUMENTS

| | | | |
|---|---|---|---|
| 1162930 | * | 6/1985 | (SU) ........................ 222/195 |
| 1253890 | * | 2/1986 | (SU) ........................ 222/195 |

* cited by examiner

*Primary Examiner*—Joseph A. Kaufman
(74) *Attorney, Agent, or Firm*—Adrian D. Battison

(57) ABSTRACT

A grain storage bin has a circular bin floor structure and a cylindrical bin wall upstanding from the floor. A bin aeration system includes a perforated air discharge tube mounted diametrically across the bin supported on a frame above the floor from one side with an air supply duct for supplying air from a fan through the wall. The floor structure is divided diametrically into two separate half sections. A discharge duct extends from a feed opening at a center of the bin horizontally under the horizontal support surface to a discharge outside the wall of the bin with a belt having an upper run along the duct. An alternative discharge includes a discharge duct extending from a feed opening adjacent a center of the bin upwardly and outwardly through an opening in the wall of the bin at a height spaced upwardly from the floor structure and a base member extending from the horizontal support surface to the duct and defining two side walls each arranged on a respective side of the duct and extending from the duct downwardly and away from the duct such that the interconnection with the base and support surface is wider than the duct and tends to shed the material outwardly away from and an area underneath the duct onto the floor.

14 Claims, 5 Drawing Sheets

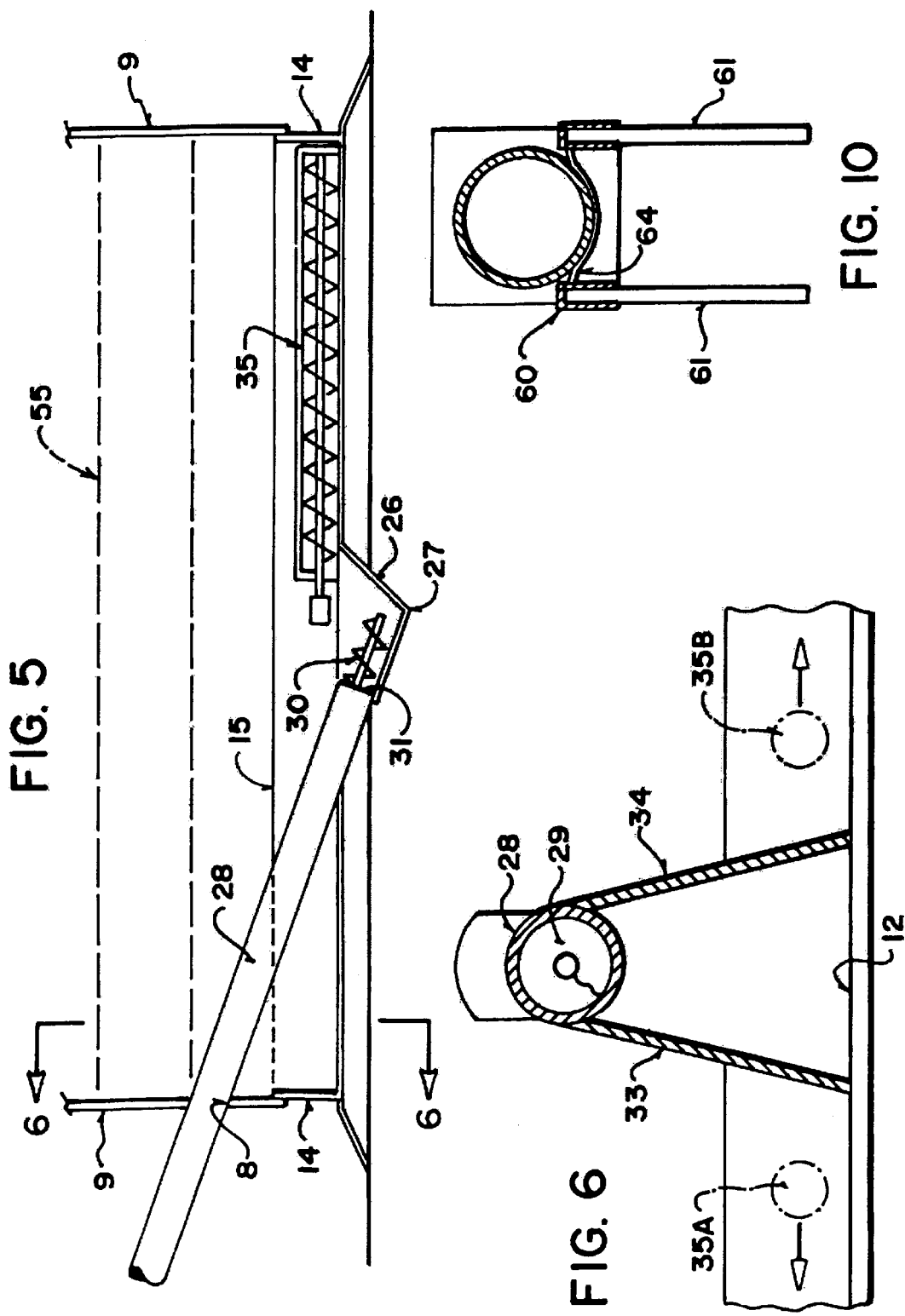

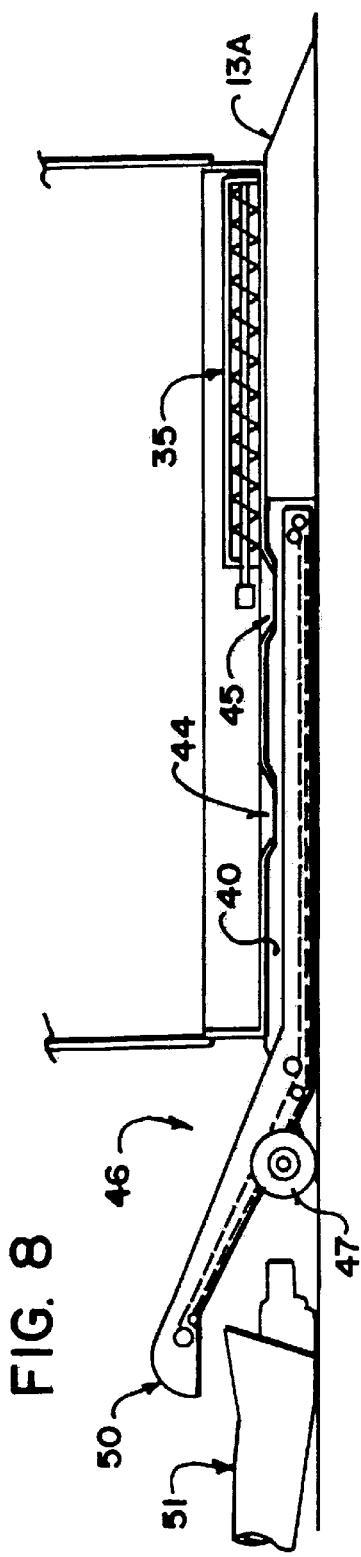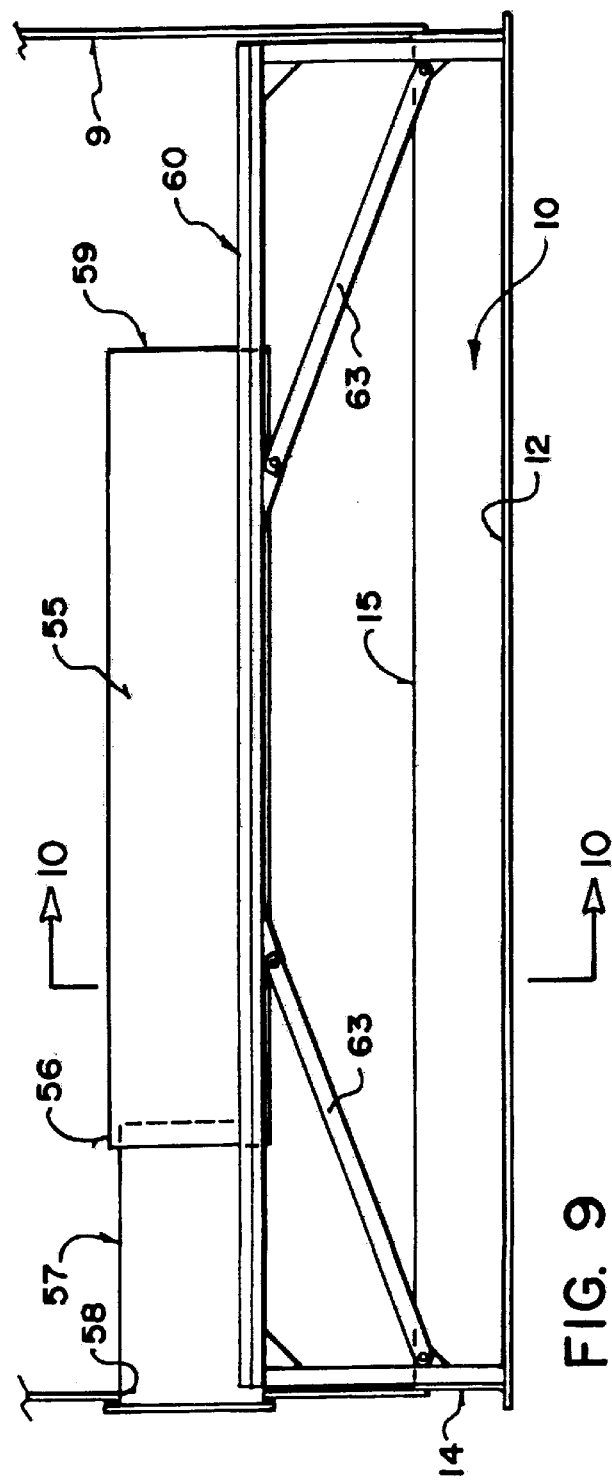

STORAGE BIN FOR PARTICULATE MATERIALS

FIELD OF THE INVENTION

This invention relates to a storage bin of the type comprising a horizontal circular base with a cylindrical peripheral wall upstanding from the base which is generally used for storing particulate materials such as grain and other crops.

BACKGROUND

Many such bins are formed by a concrete base with the peripheral wall formed from corrugated panels bolted to and standing upwardly from the edge of the concrete base.

However the requirement for the concrete base is relatively expensive and restricts the possibility for movement of the bin from place to place as requirements change.

It is known therefore to provide a base formed from sheet metal panels with an upstanding cylindrical floor section which provides a base for the remaining wall of the bin.

SUMMARY

It is one object of the present invention to provide an improved bin floor structure which assists in ready transportation of the floor structure to a site for installation.

It is a further object of the present invention to provide an improved aeration system for use in a bin of this type.

It is a further object of this invention to provide an improved discharge system for a bin of this general type.

According to the present invention there is provided a storage bin comprising:
- a bin floor structure having a circular horizontal support surface;
- a cylindrical bin wall upstanding from the support surface;
- and a bin aeration system for injecting air into a material stored in the bin, the aeration system comprising:
- a perforated air discharge tube;
- a support member extending substantially diametrically across the bin from one side to an opposed side and supporting the air discharge tube with its axis extending substantially diametrically across the bin at a height in the bin spaced upwardly from the support surface;
- and an air supply duct for supplying air from a fan through the wall into the air discharge tube for escape from the tube into the material in the bin.

Preferably the air supply duct extends partly into the bin from one side wall portion of the bin.

Preferably the air discharge tube has ends thereof terminating at a position spaced from the wall of the bin and is arranged substantially symmetrically such that the ends are substantially equal distantly spaced.

Preferably the support member comprises a pair of rails each extending parallel to and each spaced on a respective side of the axis.

Preferably the support member has a pair of end supports extending vertically upwardly along a respective side wall portion of the bin wall.

Preferably the end supports comprise a pair of legs each extending vertically upwardly to a respective one of a pair of rails defining the support member.

According to an aspect of the present invention there is provided a storage bin comprising:
- a bin floor structure having a circular horizontal support surface;
- a cylindrical bin wall upstanding from the support surface;
- and a bin discharge system for discharging material stored in the bin from the bin to a position exteriorly of the bin, the discharge system comprising:
- a discharge duct having a material transport member within the duct for transporting the material along the duct;
- the duct extending from a feed opening adjacent a center of the bin upwardly and outwardly through an opening in the wall of the bin at a height spaced upwardly from the floor structure;
- and a base member extending from the horizontal support surface to the duct and defining two side walls each arranged on a respective side of the duct and extending from the duct downwardly and away from the duct such that the interconnection with the base and support surface is wider than the duct and tends to shed the material outwardly away from and an area underneath the duct.

Preferably there is provided a recess at the center of the support surface defining a floor hopper into which the material can fall and wherein the duct has the feed opening thereof extending into the floor hopper.

Preferably a portion of the duct adjacent the feed end thereof projects into the recess and wherein the side walls extend from the wall of the bin to a position where the duct enters the recess.

Preferably there is provided a bin sweep which moves around the bin to a position adjacent each side wall of the base member for carrying the material from the support surface to the feed end of the duct.

According to an aspect of the present invention there is provided a storage bin comprising:
- a bin floor structure having a circular horizontal support surface;
- a cylindrical bin wall upstanding from the support surface;
- and a bin discharge system for discharging material stored in the bin from the bin to a position exteriorly of the bin, the discharge system comprising:
- a discharge duct having a material transport member within the duct for transporting the material along the duct;
- the duct extending from a feed opening at a center of the bin horizontally under the horizontal support surface to a discharge outside the wall of the bin;
- the material transport member comprising a belt having an upper run along the duct.

Preferably the duct is rectangular so as to receive the upper and lower runs of the belt across the width of the duct.

Preferably the duct has a first slide gate at the center of the bin and the second slide gate approximately midway between the center of the bin and the side wall of the bin.

Preferably the belt is mounted on a belt conveyor system which allows the belt to be removed from the duct to an opening at the end of the duct at the edge of the floor structure.

Preferably the belt includes an elevator section at an end thereof outside the bin for discharging the material from the bin into a main conveyor.

Preferably the storage bin includes a bin sweep.

According to an aspect of the present invention there is provided a storage bin comprising:
- a bin floor structure having a circular horizontal support wall and a cylindrical peripheral wall standing upwardly from and attached to the support wall around and at a periphery thereof;

a cylindrical bin wall attached and upstanding from a top edge of the peripheral wall of the floor;

the floor structure and the wall being formed of sheet metal;

the floor structure being divided diametrically into two separate half sections.

Preferably the support wall of each half section having a flange along an edge thereof for bolting to a flange of the other section, the flange is projecting downwardly below the horizontal wall.

Preferably each flange comprises a web of an angle iron with another web of the angle iron attached to the edge of the support wall.

Preferably the peripheral wall of each half section has an edge abutting the edge of the peripheral wall of the other half section and is bolted thereto by a joining plate.

BRIEF DESCRIPTION OF THE DRAWINGS

In the accompanying drawings, which illustrate an exemplary embodiment of the present invention:

FIG. 5 is a cross sectional view along the lines 5—5 of FIG. 4.

FIG. 6 is a cross sectional view along the lines 6—6 of FIG. 5.

FIG. 8 is a cross sectional view along the lines 8—8 of FIG. 7.

FIG. 9 is a vertical cross sectional view through the bin structure of FIG. 5 according to the present invention including an aeration system.

FIG. 10 is a cross sectional view along the lines 10—10 of FIG. 9.

DETAILED DESCRIPTION

Figure 1:
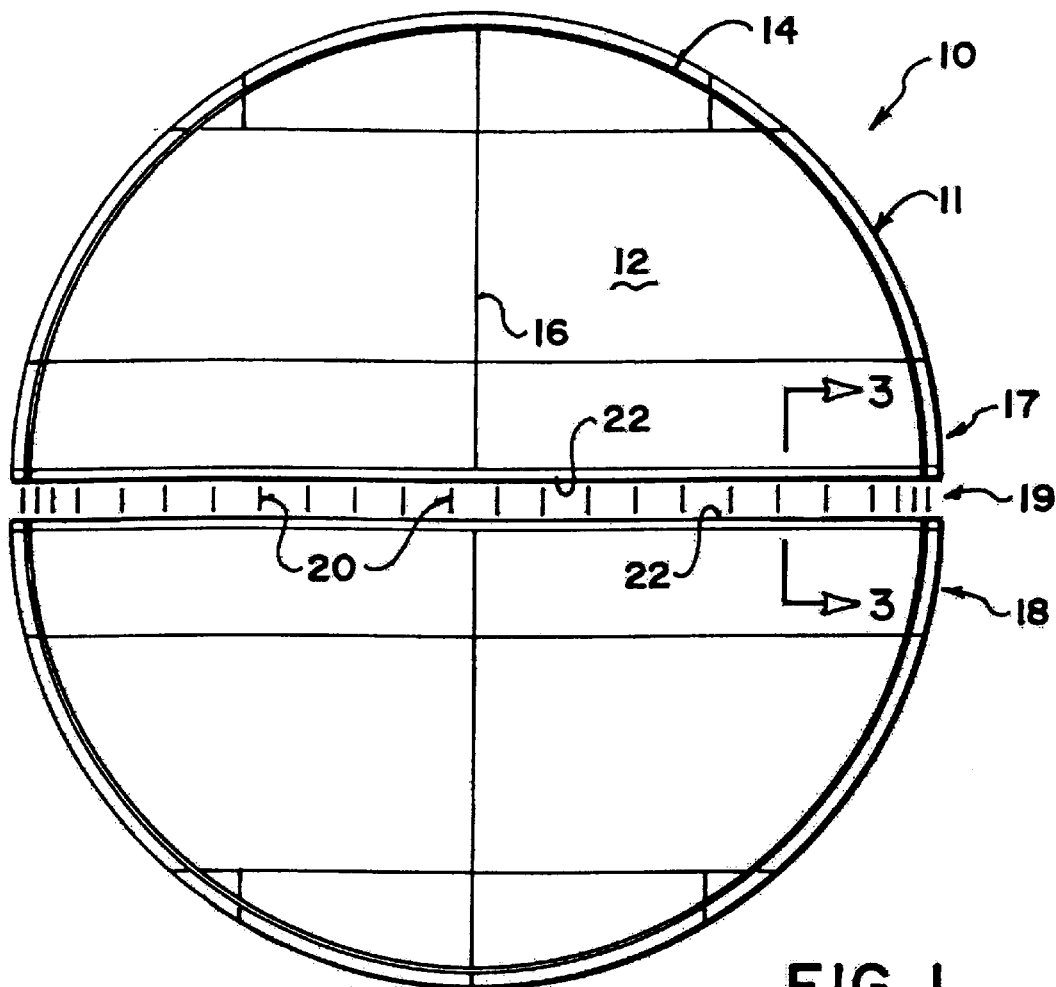
FIG. 1 is a top plan view of a floor structure for a storage bin according to the present invention.
Figure 2:
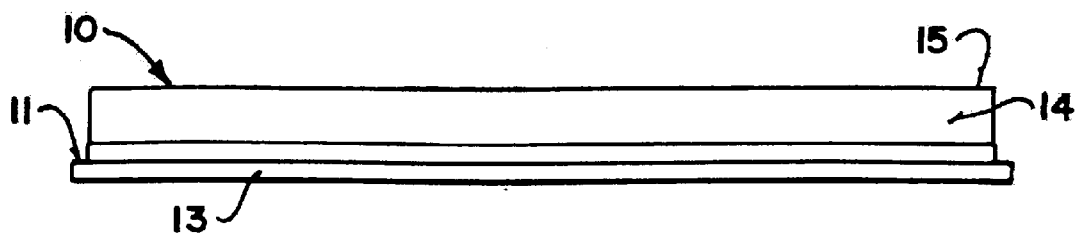
FIG. 2 is a side elevational view of the floor structure of FIG. 1.

A storage bin comprises a floor structure 10 to which is attached a conventional cylindrical wall and a roof structure (not shown). The floor structure is formed from sheet metal panels which are welded together to form a circular base 11 defining a horizontal circular upper surface 12. At the outside edge of the horizontal wall 11 is defined a turned down edge flange 13. Spaced slightly inwardly from the outer edge at the flange 13 is provided an upstanding side wall portion 14 which extends upwardly to a top edge 15 to which the side wall of the bin is attached by bolting in conventional manner.

The horizontal circular plate 11 defining the surface 12 is formed from a plurality of panels joined at edges 16.

Figure 3:
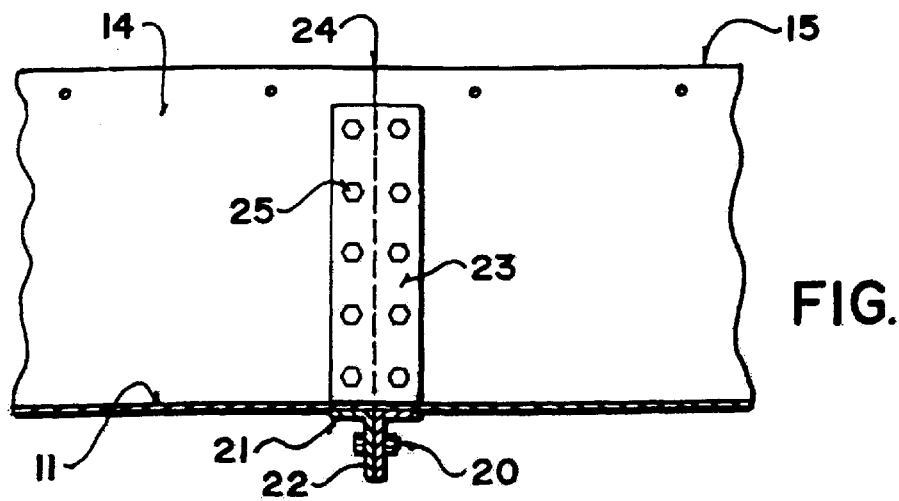
FIG. 3 is a cross sectional view along the lines 3—3 of FIG. 1.

The floor structure is divided into two sections 17 and 18 separated at a divide 19. In FIG. 3 the two sections are shown bolted together and in FIG. 1 they are shown separated and ready to be bolted together by bolts 20.

The two sections are joined together by a pair of angle iron members 21 and 22 each of which is attached to one section of the horizontal support wall 11 at the edge 22 thereof. Thus each angle iron member includes a horizontal flange welded to the edge 22 and a vertical flange extending downwardly from the horizontal wall 11 so that the two vertical flanges can be brought together and bolted together by the bolts 20. An end plate 23 bridges the junction 24 between the edges of the side wall 14 and is attached to both edges by bolts 25.

Thus floor structure can be divided into two sections by removing the bolts and thus can be readily transported from place to place for installation at a new site.

Figure 4:
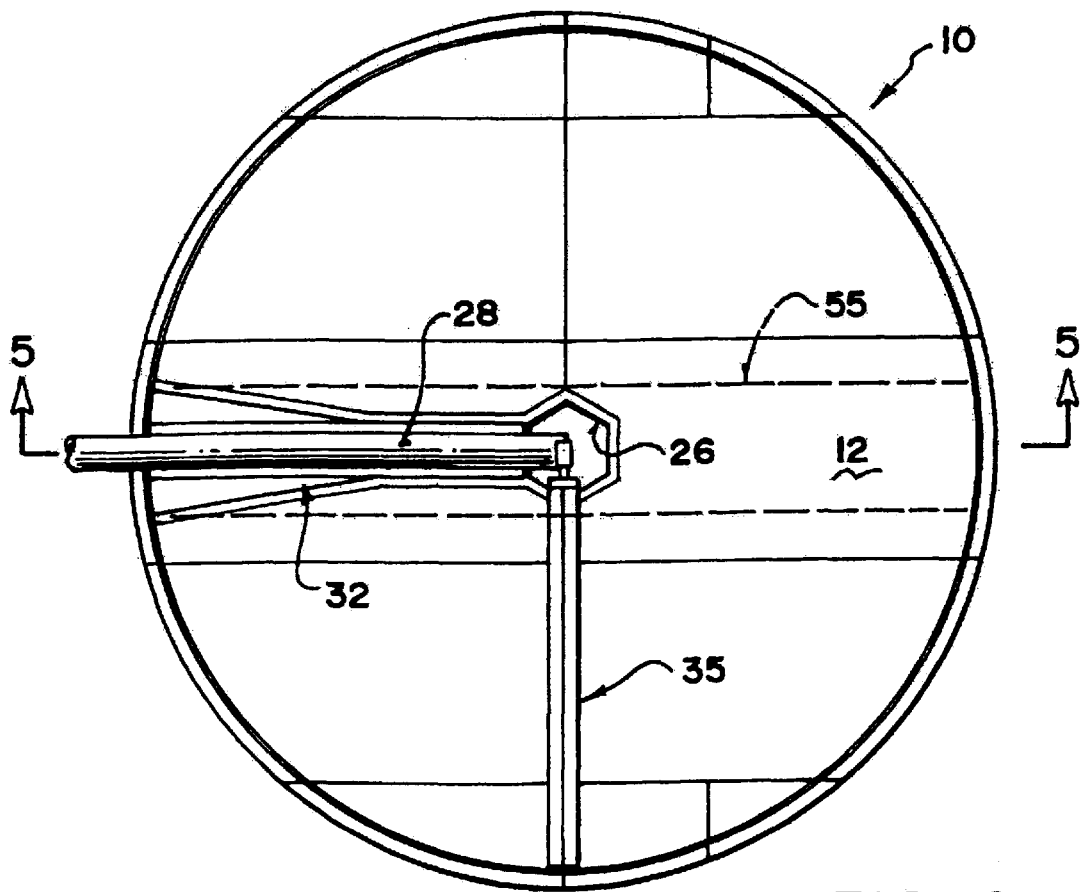
FIG. 4 is a top plan view of the bin floor of FIG. 1 modified to include a material discharge system.

Turning now to FIGS. 4, 5 and 6, there is shown the same floor structure generally indicated at 10 and the bin wall 9. In this arrangement the floor structure is modified by the addition of a recessed section 26 in the floor arranged at the center. The recessed section is generally hexagonal in shape at the surface 12 and converges to an apex 27 at the bottom. One side of the hexagonal shape receives a cylindrical tube 28 of an auger discharge system including an auger flight 29 contained within the tube. A feed section 30 of the auger flight projects beyond a lowermost end 31 of the tube 28 so as to project into the recess 26.

The duct 28 is inclined upwardly and outwardly so as to exit through the wall 9 at an opening 8 raised upwardly above the base surface 11 and upwardly of the top edge 15.

Underneath the duct 28 is provided a base structure 32 comprising a pair of side walls 33 and 34 which extend downwardly from a respective side of the duct 28 to the surface 12. Thus each side wall is generally triangular and extends from a vertical edge at the side wall 9. Each side wall has a top edge welded to and lying along the side of the tube or duct and a third edge extending along the surface 12. The side wall converges to an apex at the point where the duct passes through the surface 12 into the recess 26.

The side walls 33 and 34 are inclined downwardly and outwardly relative to a central vertical plane of the duct so as to form in effect a "pyramid" shape thus tending to shed material away from the duct and outwardly onto the floor so that the material can be carried by a bin sweep 35 of conventional construction to the recess 26. Thus the bin sweep can move position 35A at the side wall 13 around the bin to a position 35B at the side wall 34 by moving through an angle slightly less than 360° and thus sweep in effect the whole of the floor without leaving any material underneath the duct 28.

Figure 7:
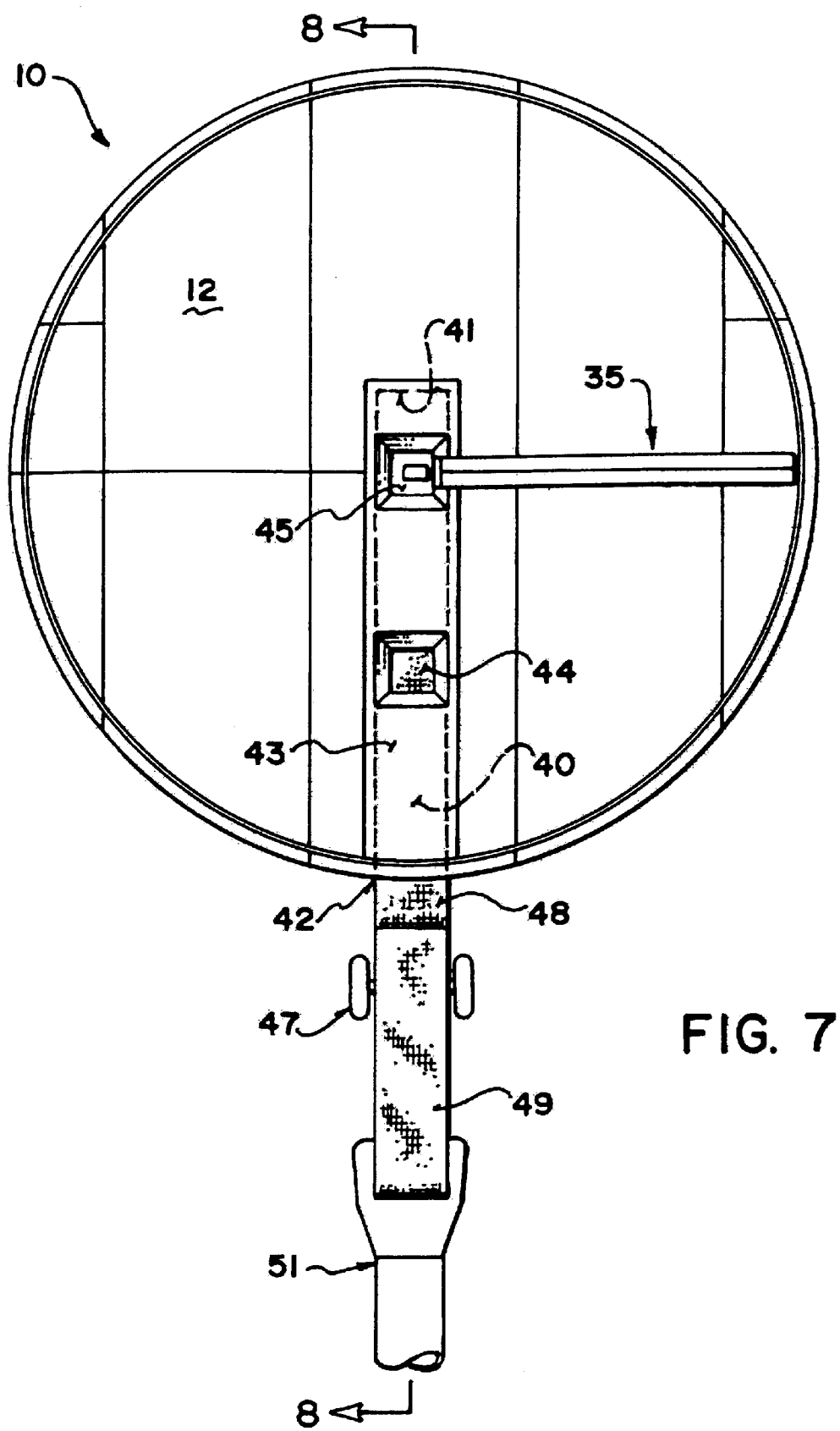
FIG. 7 is a top plan view of the floor structure of FIG. 1 showing a further modified arrangement for discharging material.

Turning now to FIGS. 7 and 8 there is shown a modified discharge arrangement for use with the floor structure 10. In this arrangement, the floor is formed with a rectangular trough 40 underneath the floor and extending along a diameter of the floor structure from an end 41 just beyond the center outwardly to a side edge at an opening 42 in the base of the floor structure. The trough is covered by a top wall 43 which fully covers the trough apart from two openings 44 and 45 each of which is covered by a slide gate operable from the end 42.

The bin sweep 35 is arranged to rotate around the full surface 12 since it can pass over the top surface 43 at the trough 40.

A belt conveyor arrangement 46 is provided mounted on a frame and ground wheels 47 by which it can be moved from bin to bin. The belt conveyor arrangement comprises a frame carrying a belt having an upper run and a lower run on elongate track arrangement which can be inserted into the trough 40. Thus an upper run 48 of the belt is located directly underneath the trough and can receive material from one or both of the openings 44 and 45. The belt conveyor further includes an elevator section 49 carrying the material to a discharge 50 for discharge into a conventional main conveyor arrangement 51.

This arrangement is located wholly under the floor of the bin structure and thus requires a raised base of the floor structure with an inclined outer flange 13A replacing the vertical flange 13. The height of the flange 13A is increased so a to provide sufficient room for the trough 40.

The arrangement is particularly suitable for materials which can be damaged by an auger flighting such as peas and the like.

Turning now to FIGS. 9 and 10, there is shown in more detail an aeration system for use with the bin floor structure 10 and the wall 9 and shown schematically in FIGS. 4 and 5. The aeration system comprises a length of perforated tube 55 which is connected at one end 56 to an imperforate or solid air tube 57 which extends from an opening 58 in the wall 9. The tube 55 has a second end 59 which is spaced substantially equal distantly relative to end 56 from the wall so that the tube sits along a diameter of the bin floor structure. The solid air tube 57 is connected to a fan outside the bin wall. The ducting included in the perforated air tube and the solid air tube are supported on a frame structure so they are carried away from the surface 12 and above the edge 15. The ducts are carried on a pair of side rails supported on vertical legs 61 so that each side rail is arranged on its respective side of the tube and each side is relatively directly attached to the top end of a respective one of the legs. The legs are arranged at the wall 9 and thus at the wall 14. The structure is braced by inclined angle braces 63. The rails are connected to the outside of the tube by transverse straps 64 which span the rails and wrap around the bottom part of the tube 55.

The tube is thus supported away from the bin floor and provides air flow at a height of the order of three feet from the bin floor so that the majority of the air is supplied in the required location substantially directly in the center of the bin.

While one embodiment of the present invention has been described in the foregoing, it is to be understood that other embodiments are possible within the scope of the invention. The invention is to be considered limited solely by the scope of the appended claims.

What is claimed is:

1. A storage bin comprising:
   a bin floor structure having a circular horizontal support surface;
   a cylindrical bin wall upstanding from the support surface;
   and a bin aeration system for injecting air into a material stored in the bin, the aeration system comprising:
   a perforated air discharge tube;
   a support member extending substantially diametrically across the bin from one side to an opposed side and supporting the air discharge tube with its axis extending substantially diametrically across the bin at a height in the bin spaced upwardly from the support surface;
   and an air supply duct for supplying air from a fan through the wall into the air discharge tube for escape from the tube into the material in the bin.

2. The storage bin according to claim 1 wherein the air supply duct extends partly into the bin from one side wall portion of the bin.

3. The storage bin according to claim 1 wherein the air discharge tube has ends thereof terminating at a position spaced from the wall of the bin and is arranged substantially symmetrically such that the ends are substantially equal distantly spaced.

4. The storage bin according to claim 1 wherein the support member comprises a pair of rails each extending parallel to and each spaced on a respective side of the axis.

5. The storage bin according to claim 1 wherein the support member has a pair of end supports extending vertically upwardly along a respective side wall portion of the bin wall.

6. The storage bin according to claim 5 wherein the end supports comprise a pair of legs each extending vertically upwardly to a respective one of a pair of rails defining the support member.

7. A storage bin comprising,
   a bin floor structure having a horizontal base wall which is circular in plan so as to define a circular periphery;
   a cylindrical bin wall attached to the best wall around the circular periphery so as to be upstanding from the base wall;
   and a bin discharge system for discharging material stored on top of the base wall and inside the cylindrical bin wall to a position exteriorly of the cylindrical bin wall, the discharge system comprising:
   a discharge duct having a material transport member within the duct for transporting the material along the duct;
   the duct extending from a feed opening adjacent a center of the base wall upwardly and outwardly through an opening in the cylindrical bin wall, the opening being arranged in the cylindrical bin wall at a height thereon spaced upwardly from the base wall;
   and a base member extending from the base wall to the duct and defining two side walls each side wall having an upper edge attached to a respective side of the duct exteriorly of the duct and a lower edge attached the base wall and each side wall being inclined from the duct downwardly and away from the other side wall such that the lower edges are space from each other by a distance greater than the width of the duct and the side walls thus tend to shed the stored material outwardly away from an area underneath the duct.

8. The storage bin according to claim 7 wherein there is provided a recess at the center of the base wall defining a floor hopper into which the stored material falls and wherein the duct has the feed opening thereof extending into the floor hopper.

9. The storage bin according to claim 8 wherein a portion of the duct adjacent the feed end thereof projects into the recess and wherein the side walls extend from the cylindrical bin wall to a position where the duct enters the recess.

10. The storage bin according to claim 7 wherein there is provided a bin sweep which moves around the bin to a position adjacent each side wall of the base member for carrying the material from the base wall to the feed end of the duct.

11. A storage bin comprising:
    a bin floor structure;
    the bin floor structure having a horizontal base wall which is circular in plan so as to define a circular periphery;
    and the bin floor structure having an upstanding cylindrical peripheral wall standing upwardly from and attached to the base wall around and at the circular periphery thereof so as to define a circular top edge spaced upwardly from the base wall; and a cylindrical bin wall attached to the upstanding cylindrical peripheral wall and upstanding from the circular top edge thereof;

the floor structure and the cylindrical bin wall both being formed of sheet metal;

the floor structure being divided diametrically into two separate half sections;

each half section including one half of the circular base wall and one half of the upstanding cylindrical peripheral wall;

each half section having a straight edge extending diametrically thereof which the straight edges of the half sections being separate from each other and arranged to be fastened together to form the floor structure.

12. The storage bin according to claim 11 wherein the circular base wall of each half section has a flange along the straight edge thereof and extending downwardly therefrom, the flanges of the two half sections being arranged for fastening together for fastening of the half sections to form the floor structure.

13. The storage bin according to claim 12 wherein each half section comprises an integral structure arranged for transportation as an integral single piece.

14. The storage bin according to claim 11 wherein the upstanding cylindrical peripheral wall of each half section has two vertical end edges each at a respective end of the straight edge, each end edge of each of the half sections being arranged to abut a respective one of the end edges of the other half section and wherein the abutting end edges are bolted together by a joining plate.

* * * * *